United States Patent
Han (10) Patent No.: US 8,164,572 B2
(45) Date of Patent: Apr. 24, 2012

(54) IMAGE FORMING APPARATUS AND METHOD OF DISPLAYING MULTILINGUAL KEYBOARD USING THE SAME

(75) Inventor: Chang Min Han, Ansan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 933 days.

(21) Appl. No.: 11/955,676

(22) Filed: Dec. 13, 2007

(65) Prior Publication Data
US 2008/0150900 A1    Jun. 26, 2008

(30) Foreign Application Priority Data
Dec. 20, 2006   (KR) .................. 10-2006-0131111

(51) Int. Cl.
G06F 3/02    (2006.01)
(52) U.S. Cl. ...................................... 345/171
(58) Field of Classification Search .................. 345/168, 345/169, 171, 172; 341/22; 715/264; 704/1–10; 717/174; 709/203, 227
See application file for complete search history.

(56) References Cited

U.S. PATENT DOCUMENTS

| | | | | |
|---|---|---|---|---|
| 5,623,682 A | * | 4/1997 | Fukunaga | 715/210 |
| 6,429,793 B1 | * | 8/2002 | Paolini | 341/22 |
| 7,193,615 B2 | * | 3/2007 | Kim et al. | 345/169 |

FOREIGN PATENT DOCUMENTS
JP    9-44480    2/1997
* cited by examiner

*Primary Examiner* — Abbas Abdulselam
(74) *Attorney, Agent, or Firm* — Stanzione & Kim, LLP (57) ABSTRACT

An image forming apparatus and method of displaying a multilingual keyboard uses an identifier of a language-specific entity, such as a country-code top-level domain of a domain name in an e-mail address to automatically output an input device configuration, such as a keyboard configuration, in accordance with stored keyboard table information corresponding to country identification information of a target recipient using the e-mail address of the target recipient, thereby increasing the convenience of use. The image forming apparatus receives an input email address of a target recipient, detects country identification information in the email address, searches stored keyboard information for that corresponding to the detected country identification information, and displays the keyboard in the language corresponding to the country identification information found in the searching of the stored country identification information.

26 Claims, 6 Drawing Sheets

| | | | | | | | | | |
|---|---|---|---|---|---|---|---|---|---|
| あ | か | さ | た | な | は | ま | や | ら | |
| い | き | し | ち | に | ひ | み | | り | |
| う | く | す | つ | ぬ | ふ | む | ゆ | る | |
| え | け | せ | て | ね | へ | め | | れ | 〃 |
| お | こ | そ | と | の | ほ | も | よ | ろ | ° |

IMAGE FORMING APPARATUS AND METHOD OF DISPLAYING MULTILINGUAL KEYBOARD USING THE SAME

CROSS-REFERENCE TO RELATED APPLICATIONS

This application claims the benefit under 35 U.S.C. §119(a) of Korean Patent Application No. 2006-131111, filed on Dec. 20, 2006, in the Korean Intellectual Property Office, the disclosure of which is incorporated herein by reference in its entirety.

BACKGROUND OF THE INVENTION

1. Field of the Invention

The present general inventive concept relates to multilingual automatic indicia output, and more particularly to a multilingual automatic output system and method using identifiers of language-specific entities capable of automatically outputting indicia of multiple languages.

2. Description of the Related Art

By convention, an apparatus, such as a printer, a multifunctional peripheral (MFP), a copier, a facsimile, and a scanner, capable of outputting image data to an output medium, such as a display device or printing paper, is referred to as an image forming apparatus. Performance enhancements to the image forming apparatus now allows such a device to output image data directly to a network, e.g., to transfer an e-mail message without a personal computer (PC).

Such an image forming apparatus can not only receive the address and contents of an e-mail from a user using a graphical user interface (GUI), but, when provided with a communications adapter, such as a network card, can also send a scanned document, a received facsimile, and an e-mail prepared by the user without a PC.

In certain cases, the image forming apparatus is provided with functionality to pre-store e-mail addresses that are frequently used and to concurrently send a particular e-mail message to members of a group of people.

In the conventional case of sending an e-mail using an image forming apparatus, a user or sender selects a function to send an e-mail message, and then a window to enter the message and indicia representing keys to form a graphical keyboard are displayed on a screen. Subsequently, the user enters the recipient's address and the contents of the e-mail message that is to be sent in the appropriate portions of the send window, and sends the prepared e-mail.

However, in the conventional case, when the sender wants to change the keyboard language, that is, when the user wants to send the e-mail in the language of the intended recipient, the sender must first reconfigure the graphical keyboard by selecting the desired language from a language choice menu, and only then can prepare the e-mail message, which, at a minimum, is inconvenient for the sender.

In other words, when the sender wants to send the e-mail in the desired language, the sender is inconvenienced in that he/she must manually select the languages one by one.

SUMMARY OF THE INVENTION

The present general inventive concept provides an image forming apparatus and a method of displaying a multilingual keyboard using the same, and more particularly, an image forming apparatus in which a keyboard thereof is automatically configured in accordance with identification information of an email message being composed.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing an image forming apparatus, which includes a storage unit in which identification information on countries and keyboard information corresponding to the country identification information are stored, a detection unit to detect the country identification information in an e-mail address, and a control unit that to search whether the detected country identification information is stored in the storage unit, and if so, retrieves the keyboard information corresponding to the country identification information, and a display unit to display a keyboard with the retrieved keyboard information corresponding to the country identification information.

The control unit may provide a message indicating that the detected country identification information is not stored in the storage unit.

The display unit may display items of country identification information and items of keyboard information corresponding to the items of country identification information.

The image forming apparatus may further include an input unit to be manipulated by a user to select country identification information from among the items of country identification information.

The input unit may include a control to be manipulated by a user to select country identification information of a target recipient from among the items of country identification information.

The foregoing and/or other aspects and utilities of the present general inventive concept may also be achieved by providing a method of displaying a multilingual keyboard using an image forming apparatus including inputting an e-mail address of a recipient target, detecting country identification information in the input e-mail address, searching stored keyboard information for that corresponding to the country identification information, and displaying a keyboard in a language corresponding to the country identification information found in the searching of the stored keyboard information.

The method may further include composing an e-mail using the keyboard.

A warning message may be displayed if the keyboard information corresponding to the detected country identification information is not found in the searching of the stored keyboard information.

The keyboard information corresponding to the detected country identification information may be selected by a user if the keyboard information corresponding to the country identification information is not found in the searching of the stored keyboard information.

A plurality of items of keyboard information corresponding to the country identification information may be displayed.

The user may select and input one of the items of keyboard information from among the items of displayed keyboard information.

The foregoing and/or additional aspects and utilities of the present general inventive concept may also be achieved by providing image forming apparatus comprising an input unit to receive a string of characters in a predetermined format, the input unit including input controls to be configured in any of a plurality of languages, a detection unit to determine if the string of characters includes an identifier of a language-specific entity, and a control unit to configure the input controls in one of the plurality of languages corresponding to the identifier of the language-specific entity.

The foregoing and/or additional aspects and utilities of the present general inventive concept may also be achieved by providing a method of configuring an input device in a language of a language-specific entity, the method comprising providing an input unit including input controls to be configured in any of a plurality of languages, receiving a string of characters in a predetermined format, determining if the received string of characters includes an identifier of the language-specific entity, and configuring the input controls in one of the plurality of languages corresponding to the identifier of the language-specific entity.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

As will be described in detail throughout the exemplary application below, the present general inventive concept obtains language-specific identifiers, such as country-identifying information, from a string of characters, for example, the top-level domain (TLD) information contained in the Internet domain name of a target user. Internet domain names include a sub-domain identifier, such as "USPTO," which, when combined with the TLD, in this case, "gov" forms the domain name of the organization, "uspto.gov." As of the time of the present general inventive concept, the top-level domains for the Internet are assigned through the Internet Assigned Numbers Authority (IANA), which is under the auspices of the Internet Corporation for Assigned Names and Numbers (ICANN). The IANA has three top-level domain categories, which include: country-code top-level domains (ccTLD), indicated in the domain name by a two-letter code indicating the named country, e.g., "kr" indicates Korea; generic top-level domains (gLTD), which are a three or more letter code in the domain name indicating the classification of the named organization, e.g., "com" indicates a commercial organization and "mil" indicates a military organization; and infrastructure top-level domains of which "arpa" is the only one.

Although an organization in any country can register a domain name having a "com" TLD, many countries have a second-level domain under their ccTLD for identifying the organization. For example, in Japan, the ccTLD for a commercial organization is "co.jp", while in Argentina, the ccTLD for such an organization is "com.ar". Additional ccTLD organizational identifiers exist, such as, "ac" (for educational institutions), "go" (for governmental institutions), "or" (for non-profit institutions and organizations), "ne" (for networks) and "pe" (for individuals). The present general inventive concept is intended to encompass all such naming conventions. Indeed, the present general inventive concept is not limited to any particular naming convention to identify a recipient target.

In the exemplary embodiments to be described below, the domain name included in the email address of the recipient target is used to identify the country of that target. It is to be understood, however, that the present general inventive concept is not limited to email addresses. Indeed, the present general inventive concept may be practiced on any string of characters from which language information associated with a language-specific entity may be derived.

Figure 1:
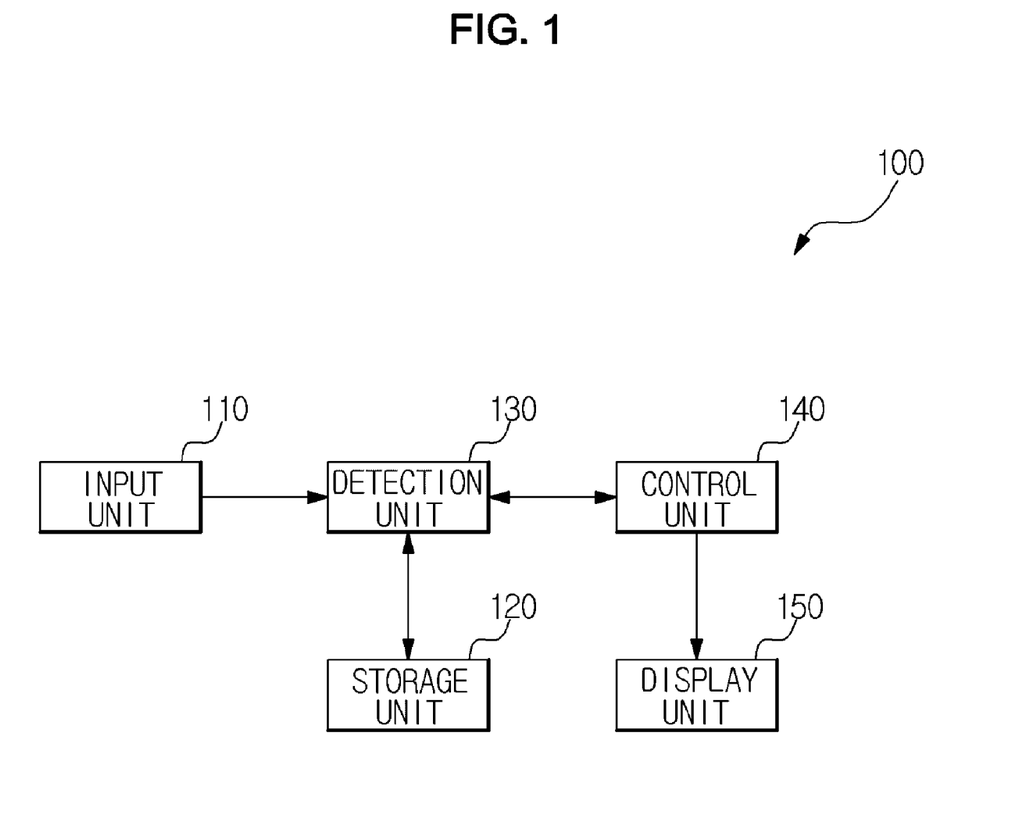
FIG. 1 is a control block diagram illustrating an image forming apparatus according to an exemplary embodiment of the present general inventive concept.

FIG. 1 is a block diagram of an image forming apparatus according to an exemplary embodiment of the present general inventive concept. As illustrated in FIG. 1, the image forming apparatus 100 includes an input unit 110, a storage unit 120, a detection unit 130, a control unit 140, and a display unit 150. It is to be understood that the exemplary image forming apparatus 100 may have components other than those illustrated that perform, for example, various image forming functions, but such have been omitted to avoid undue complexity in the drawing and corresponding description thereof. Moreover, the components embodying the general inventive concept may be implemented in hardware, software, or a combination of both. It is to be understood, also, that although the elements depicted in FIG. 1 are separated for purposes of explanation, the present general inventive concept is not limited to such configuration, and combinations or further division of functional components of the general inventive concept fall within the intended spirit and scope thereof.

In certain embodiments of the present general inventive concept, the input unit 110, the display unit 150, and the control unit 140 are included in a graphical user interface (GUI). The input unit 110 may include a hardware keyboard, may be formed as a set of software keys formed on the display unit 150, such as when the display unit 150 is a touch-sensitive screen display, or may be a combination of both, such as a key mapping of a hardware keyboard displayed on the display unit 150. Additionally, the present general inventive concept may be applied to input controls that are not in a standard keyboard configuration. The embodiment described below, however, assumes that the display unit 150 is such a touch-sensitive screen display and, for purposes of explanation and not limitation, the keyboard of the input device 110 is formed as indicia on the display unit 150. Other variations, modifications and implementations to practice the present general inventive concept will become apparent to the skilled artisan upon review of this disclosure.

Figure 2:
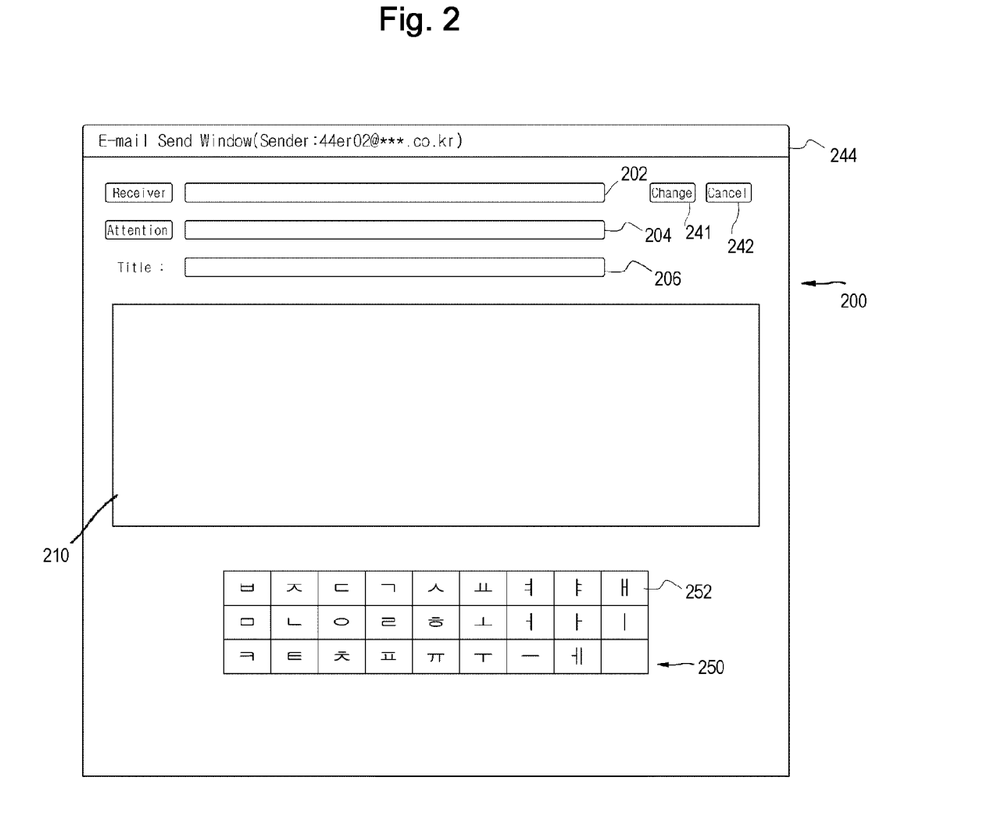
FIG. 2 illustrates a screen having an initially blank window for sending an e-mail according to an exemplary embodiment of the present general inventive concept.

FIG. 2 illustrates an exemplary screen 200 in an initially blank state for sending an e-mail in accordance with the present general inventive concept. The screen 200 may be formed in a suitable windowed operating environment for displaying windowed components and controlling the placement, appearance and inter-component messaging of the windowed components. The present general inventive concept is not limited by the implementation details of the operating environment to form the screen 200.

As is illustrated in FIG. 2, the exemplary screen 200 is divided into several windowed fields: a receiver field 202 to receive the e-mail address of one or more target recipients, an attention field 204 to receive the e-mail address of one or more auxiliary recipients, a title field 206 to receive a brief description of the subject matter of the message, a message field 210 to receive the body of the e-mail message, and a keyboard field 250 to display a layout of keys, a representative one of which is illustrated at 252. Other components, such as buttons, representatively illustrated at 241, 242, and menu bars, representatively illustrated at 244, may also be incorporated into screen 200 and the present general inventive concept is intended to encompass configurations having additional and alternative components than those illustrated in FIG. 2 or described in conjunction therewith.

Referring now to FIGS. 1 and 2, the user, or sender, may enter the recipient's e-mail address into the receiver field 202 via the input unit 110.

Assuming, for purposes of illustration, that the identifier of the recipient, Kil-Dong HONG is "hkd," and that the trade name of the corresponding site of the Korean business institution is "*," the e-mail address of Kil-Dong HONG is "hkd@*.co.kr." The exemplary apparatus obtains the country, institution, trade or brand name by extracting the domain name segments from the character string forming this e-mail address.

In certain embodiments of the present general inventive concept, the storage unit 120 stores information to configure keys of a keyboard in a keyboard table corresponding to the identification information on the country. Such a correspondence may be established through a suitable database in storage unit 120, such as a lookup table.

The storage unit 120 may be implemented through a suitable storage medium, such as a dynamic random access memory (DRAM), a synchronous dynamic random access memory (SDRAM), a rambus dynamic random access memory (RDRAM), a double data rate (DDR) SDRAM (DDRAM), or a static random access memory (SRAM). In certain embodiments of the present general inventive concept, the storage unit 120 stores image information of indicia to display at the respective key positions of the keyboard on the display unit 150 in the language of the recipient, as well as the identification information on the country and the keyboard table information corresponding to the identification information on the country.

In certain embodiments of the present general inventive concept, the identification information specific to each country is stored as an identifier code, such as KR001 for Korea, JP002 for Japan, CN003 for China, etc., in a header area of the storage unit 120. The keyboard table information on the Korean language, Hangeul, may be assigned a location in storage unit 120 corresponding to KR001, the Japanese language may be assigned a location in storage unit 120 corresponding to JP002, and Chinese language may be assigned a location in storage unit 120 corresponding to CN003, and so on.

The keyboard table information may include layout information so that the keyboard is arranged in a familiar layout, such as that of a typewriter of the country whose character set is being used, with indicia corresponding to the character set at each appropriate key location. In the case of the Korean language, the keyboard table information includes information on Hangeul (vowels and consonants), alphabets, digits, special characters (non-characters), and twelve function keys. The keyboard details in the keyboard table may include information on a set of keys so as to form a complete keyboard image on the display device 160 so that a user can check, edit and correct input contents. It is to be understood, however, that the present general inventive concept may be practiced with configurations of input controls other than standard keyboard configurations.

In certain embodiments of the present general inventive concept, a default keyboard is initially displayed and corresponds to the keyboard table information of default country identification information. In certain embodiments, the default country corresponds to the sender's e-mail address. For example, as is illustrated in FIG. 2, the keyboard 250 is configured for the Korean sender, 44er02@***.co.kr, as is displayed in the menu bar 244. Additionally, when the input unit 110 is set to enter an e-mail address, such as when a cursor is positioned in receiver field 202, the input system may include keys for the English language, so as to enter the domain name segments with the required English alphabet. However, in future implementations of addressing where English characters are no longer necessary, should there be such, English keys, other than for the English keyboard character set in the keyboard information table, can be avoided. The present general inventive concept encompasses all such alternative implementations.

However, when the e-mail address of the target recipient is, for example, "hkd@***.co.jp", the present general inventive concept configures the input unit 110 to allow the e-mail to be composed in Japanese, because the country domain is Japan, and the target recipient can then read the e-mail in his/her own language.

Figure 3:
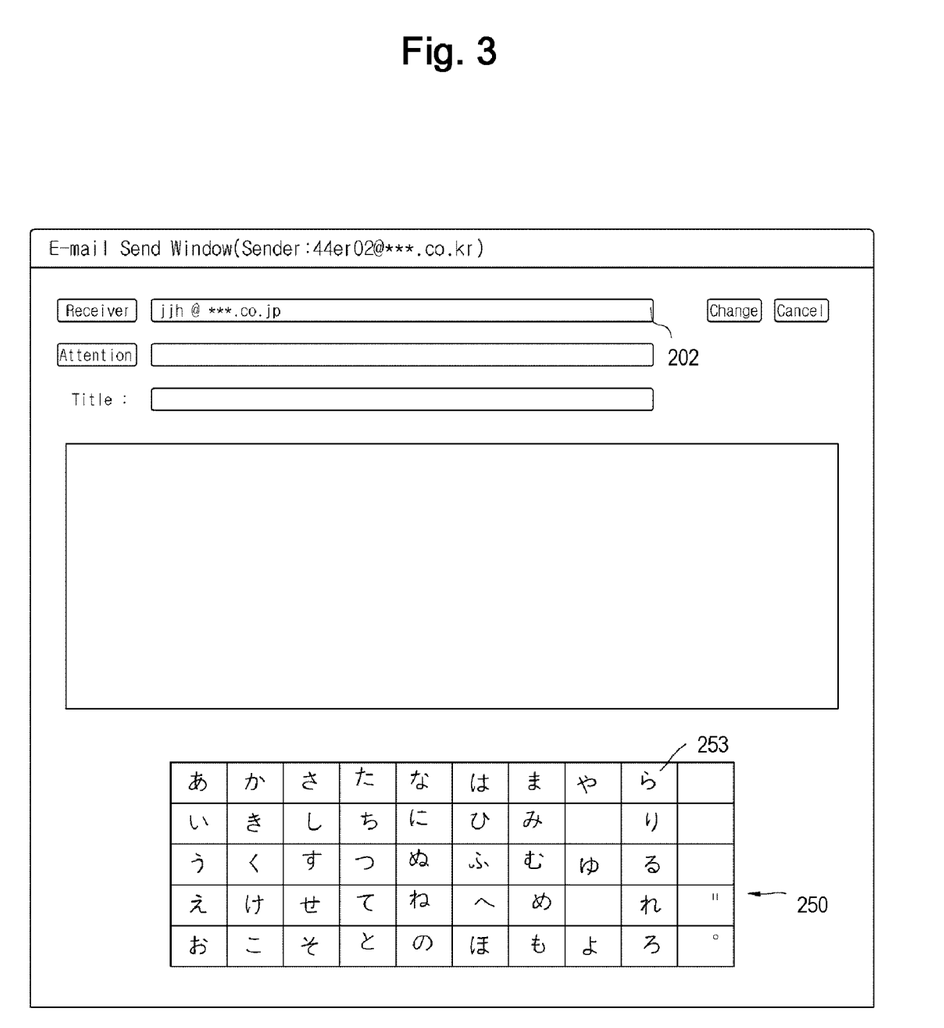
FIG. 3 illustrates a screen having a keyboard that, after an e-mail address of a target recipient is input, is output with keyboard table information of country identification information corresponding to the e-mail address according to an exemplary embodiment of the present general inventive concept.

Thus, the output configuration of the keyboard is in accordance with the Japanese language, as the keyboard table information corresponds to the ccTLD in the e-mail address, "hkd@***.co.jp", input into the input unit 110. An exemplary screen 200 displaying the case just described is illustrated in FIG. 3.

As indicated in FIG. 1, the input unit 110 provides the input e-mail address to the detection unit 130, which parses the input e-mail address to detect the country identification information.

As described above, the domain of the input e-mail address includes the top level domain, which occupies the extreme right segment of the domain name. The TLD can be a general top-level domain, such as "com," "net" or "org" or a country code top-level domain such as "kr" or "jp."

The general top-level domains, since the beginning of the Internet, include: "com," "net," "org," "edu," "mil," "nt," and "gov." Among these domains, three domains, "edu," "mil" and "gov," can be registered and used by only institutions within United State of America (USA), and one domain, "nt," is registered and used by international organizations such as the United Nations (UN).

In accordance with certain embodiments of the present general inventive concept, the detection unit 130 parses the input e-mail address with respect to this domain information, and determines whether the country identification information is available at the top level of the domain name in the e-mail address. If the top level of the input e-mail address is a country code top-level domain, the country identification information may be extracted. However, if the top level of the input e-mail address is a general top-level domain, the country identification information is not detected.

For example, if the top level of the input e-mail address is the country code top-level domain such as "kr" or "jp," it is possible to determine whether the country identification information is Korea or Japan. However, if the top level of the input e-mail address is the general top-level domain such as "com," "net" or "org," the country identification information cannot be determined from the top level segment of the e-mail address.

FIG. 3 illustrates the previously described screen 200 having a keyboard 250 that, after an e-mail address of a target recipient is input to the receiver field 202, is displayed in accordance with keyboard table information of country identification information corresponding to the e-mail address. Referring also to FIG. 1, when the country identification information is detected, the detection unit 130 provides the country identification information to the control unit 140, which compares the detected country identification information with identification information stored in storage unit 120. If the same identification information as the detected country identification information exists in storage unit 120, the control unit 140 configures the keyboard using the keyboard table information corresponding to the country identification information.

In other words, if the keyboard table information corresponding to the country identification information is stored in the storage unit 120, the control unit 140 configures the keyboard so that the user, i.e. the message transmitter, can prepare the e-mail in the language required by the target recipient.

Therefore, the keyboard is automatically configured with the keyboard table information in accordance with the country identification information provided in the domain name in the input e-mail address, so that the user can avoid the inconvenience of manually configuring the keyboard.

If the country identification information is not detected from the input e-mail address, the exemplary display unit 150 may display a warning message informing the user that no country identification information has been detected.

Figure 4:
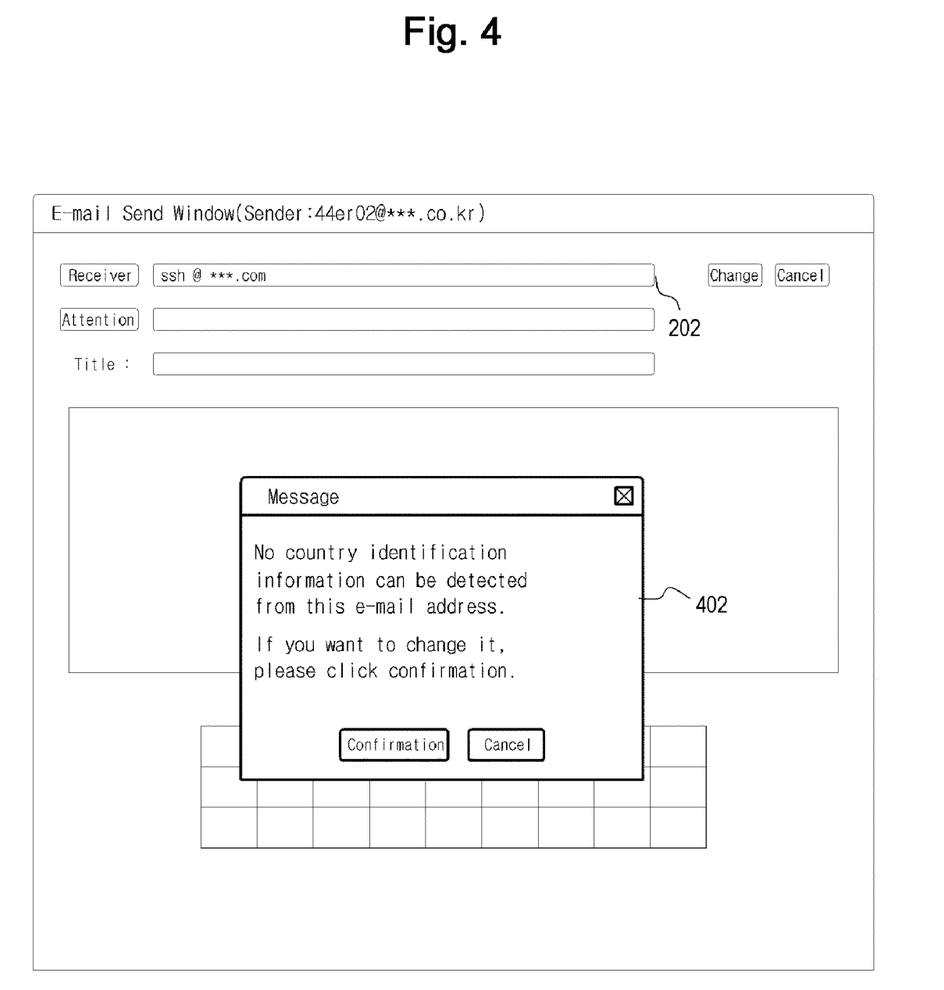
FIG. 4 illustrates a screen on which a warning message informing that no country identification information is displayed according to an exemplary embodiment of the present general inventive concept.

FIG. 4 illustrates an exemplary warning screen 402 on which a warning message is displayed informing the user that no country identification information has been detected. Referring to FIG. 1, the control unit 140 receives an indication from the detection unit 130 that a ccTLD was not parsed. Accordingly, the control unit 140 formats a warning message like "No country identification information can be detected from this e-mail address. If you want to change it, please click confirmation," as is illustrated in FIG. 4, and provides the message to the display unit 150.

In certain embodiments of the present general inventive concept, if no ccTLD is detected, the user is provided an option to select the keyboard table information. For example, the user may actuate a confirmation button for selecting the output, and then the display unit 150 displays the stored country identification information on the display unit 150.

Using the example of FIG. 4, the e-mail address entered in the receiver field 202 is "ssh@***.com", and the country identification information cannot be detected from the e-mail address. Hence, the country identification information, such as Japan, USA, Korea, China, France, etc. stored in the storage unit 120 is displayed, and the desired keyboard configuration may be selected. Thereby, the keyboard can be output through the keyboard table information required by the user.

Figure 5:
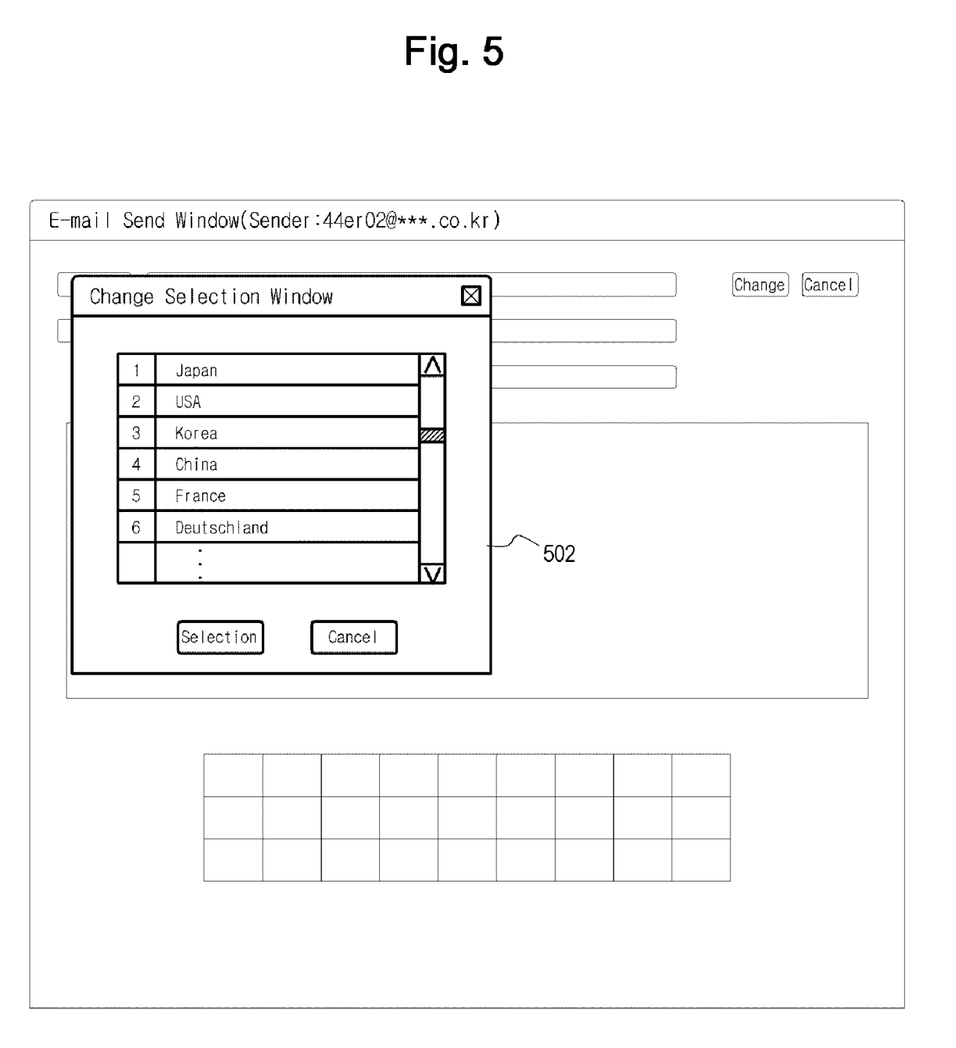
FIG. 5 illustrates a screen on which identification information stored in a storage unit is displayed according to an exemplary embodiment of the present general inventive concept.

FIG. 5 illustrates a change selection window 502 on which stored identification information is displayed. As illustrated in FIG. 5, many items of identification information on each country, such as Japan, USA, Korea, China, France, Deutschland, etc. stored in the storage unit 120 are displayed, and one of the target recipients, which is selected from among the displayed identification information, is input to the input unit 110.

In other words, among the displayed Japan, USA, Korea, China, France, Deutschland, etc., the identification information corresponding to the country of the target recipient is input to the input unit 110.

In certain embodiments of the present general inventive concept, when the ccTLD is in the domain name in the e-mail address, the control unit 140 compares the detected country identification information with the stored identification information. As a result, if the detected country identification information does not correspond to any stored identification information, the control unit 140 controls the display unit 150 to display a warning message informing the user that the keyboard table information corresponding to the country identification information cannot be output.

In other words, if there is no keyboard table information corresponding to the country identification information stored in the storage unit 120, the control unit 140 controls the display unit 150 to display the warning message informing the user that the keyboard table information corresponding to the country identification information is not available.

Additionally, the control unit 140 may determine whether the keyboard table information corresponding to the identification information is identical to default keyboard table information.

If the keyboard table information corresponding to the identification information is determined to be identical to default keyboard table information, the control unit 140 controls the keyboard to be output using the default keyboard table information with no change.

In other words, if the default keyboard table information is for Japan, the control unit 140 determines whether the keyboard table information corresponding to the identification information is identical to that for Japan. Accordingly, if the two pieces of keyboard table information are determined to be identical to each other, the keyboard table information for Japan, the default keyboard table information is output without further processing.

In certain embodiments of the present general inventive concept, when the user selects an e-mail send function, and thereby an e-mail send screen 200 is activated, the user inputs the e-mail address of the target recipient in the receiver field 202, and selects a button 241 for changing the keyboard table information.

The input e-mail address is then parsed, and the country identification information in the e-mail address is obtained from the domain name therein. Then, it is determined whether the default identification information is identical to the country identification information. If the two pieces of identification information are determined to be identical to each other, it is determined whether the default keyboard table information is identical to the keyboard table information corresponding to the identification information. Thereby, if the two pieces of keyboard table information are determined to be identical to each other, the keyboard is controlled to be output with no change using the default keyboard table information.

If the keyboard table information corresponding to the identification information is determined not to be identical to the default keyboard table information, the control unit 140 controls the keyboard to be output using the keyboard table information corresponding to the identification information.

For example, if the keyboard table information corresponding to the identification information is for Japan, and if the present keyboard table information is for Korea, the two pieces of keyboard table information are not identical to each other. Thus, the keyboard is controlled to be output using the keyboard table information corresponding to the e-mail address of the target recipient, i.e., for Japan.

As previously stated, the keyboard may be a component of a graphical user interface (GUI), such as a touch screen, and the input unit 110 may also include a mouse or a track ball, which can be used to position a cursor or a caret on the screen. The keyboard may be displayed as an image on the display device 160.

A method of displaying a multilingual keyboard on an image forming apparatus using an e-mail address will now be described.

Figure 6:
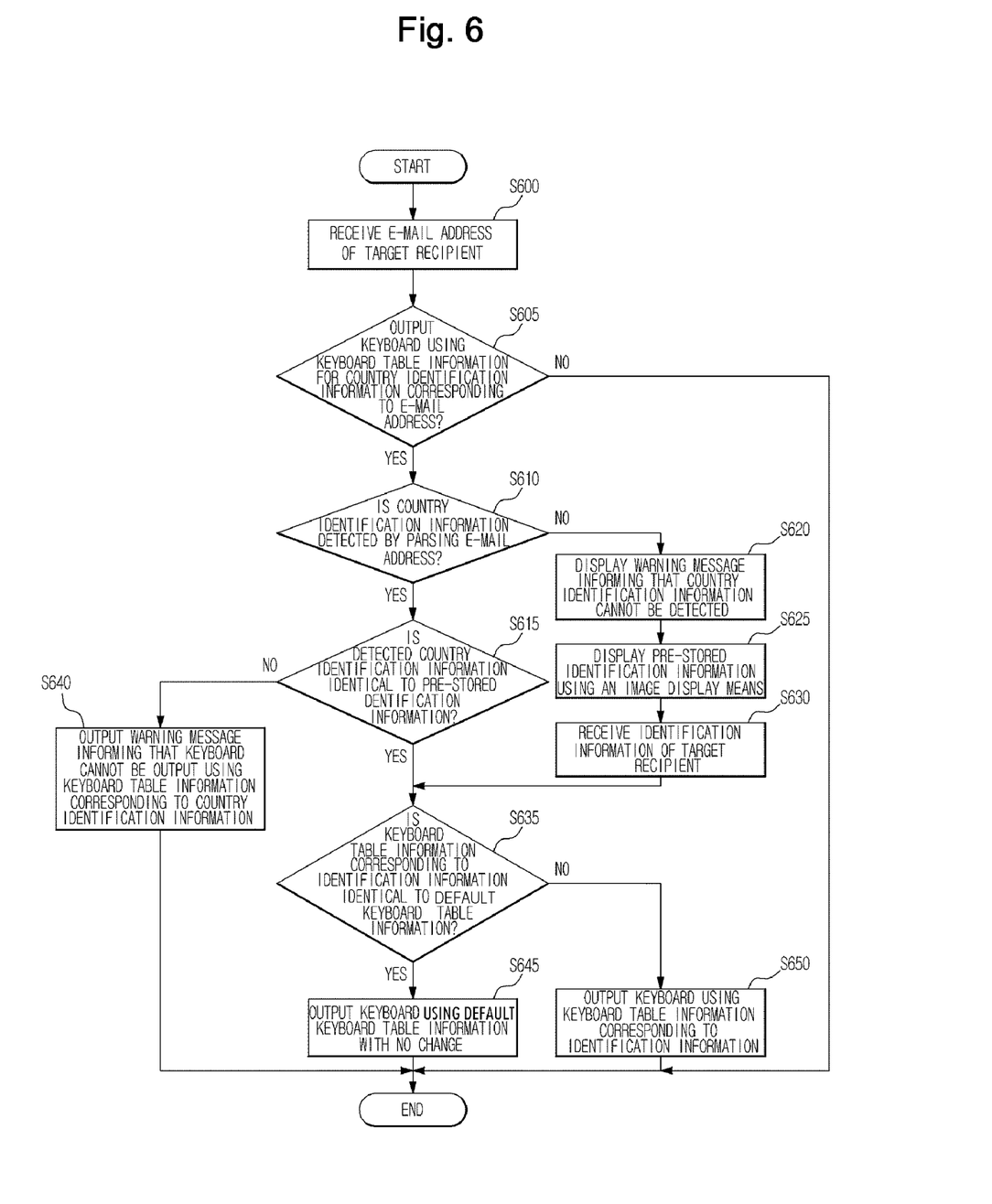
FIG. 6 is an operation control flowchart for explaining a method of displaying a multilingual keyboard using an image forming apparatus according to an exemplary embodiment of the present invention.

FIG. 6 is a control flowchart explaining a method of displaying a multilingual keyboard using an e-mail address in accordance with an exemplary embodiment of the present general inventive concept. As illustrated in FIG. 6, the e-mail address of a target recipient is input (operation S600).

Next, it is determined whether a keyboard is to be output using keyboard table information for country identification information corresponding to the input e-mail address (operation S605).

If the keyboard is determined to be output using keyboard table information for country identification information corresponding to the input e-mail address, the input e-mail address is parsed, and thereby it is determined whether the country identification information is detected (operation S610).

If the country identification information is determined to be detected by parsing the input e-mail address, it is determined whether the detected country identification information is identical to pre-stored identification information (operation S615).

Otherwise, if the country identification information is not detected by parsing the input e-mail address, a warning message informing the user that the country identification information cannot be detected is displayed (operation S620). Subsequently, the pre-stored identification information is displayed on the display device 160 (operation S625), and then the identification information of the target recipient is input (operation S630).

Meanwhile, if the country identification information is identical to the identification information, it is determined whether the keyboard table information corresponding to the identification information is identical to pre-stored keyboard table information (operation S635). If the detected country identification information is determined not to be identical to the pre-stored identification information, a warning message informing that the keyboard cannot be output using the keyboard table information corresponding to the country identification information is displayed (operation S640).

After it is determined whether the keyboard table information corresponding to the identification information is identical to preset keyboard table information, if the keyboard table information corresponding to the identification information is determined to be identical to default keyboard table information, the keyboard is controlled to be output using the default keyboard table information with no change (operation S645).

However, if the keyboard table information corresponding to the identification information is determined not to be identical to the default keyboard table information, the keyboard is controlled to be output using the keyboard table information corresponding to the identification information (operation S650).

As described above, according to the present invention, the image forming apparatus and method using the country code top-level domain information, such as in the e-mail address, can automatically output the keyboard on the basis of the keyboard table information corresponding to the country identification information of the target recipient to avoid the inconvenience of configuring the keyboard manually.

Consequently, it is possible to increase convenience of use over other systems of the prior art.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of displaying a multilingual keyboard using an image forming apparatus, the method comprising:
   inputting an e-mail address of a target recipient;
   detecting country identification information in the input e-mail address that is different from a location of the target recipient;
   searching stored keyboard information for that corresponding to the detected country identification information; and
   displaying the keyboard in a language corresponding to the country identification information found in the searching of the stored keyboard information.

2. The method as claimed in claim 1, further comprising: composing an e-mail using the keyboard.

3. The method as claimed in claim 1, wherein, if the keyboard information corresponding to the detected country identification information is not found in the searching of the stored keyboard information, a warning message indicative thereof is displayed.

4. The method as claimed in claim 3, wherein, if the keyboard information corresponding to the detected country identification information is not found in the searching of the stored keyboard information, the keyboard information is manually selected by a user.

5. The method as claimed in claim 1, wherein the displaying of the keyboard includes displaying a plurality of items of keyboard information corresponding to the country identification information.

6. The method as claimed in claim 5, wherein a user selects and inputs one item of the keyboard information from among the plurality of items of displayed keyboard information.

7. An image forming apparatus comprising:
   a storage unit to store a plurality of items of country identification information and plurality of items of keyboard information corresponding to the country identification information;
   a detection unit to detect the country identification information in an e-mail address of a target recipient that is different from a location of the target recipient;
   a control unit to search whether the detected country identification information is stored in the storage unit, and if the detected country identification information is stored in the storage unit, retrieves the keyboard information corresponding to the country identification information from the storage unit to be displayed; and a display unit to display a keyboard with the retrieved keyboard information corresponding to the country identification information.

8. The image forming apparatus as claimed in claim 7, wherein the control unit provides a message indicating that the detected country identification information is not stored in the storage unit.

9. The image forming apparatus as claimed in claim 7, wherein the display unit displays the items of country identification information and the items of keyboard information corresponding to the country identification information.

10. The image forming apparatus as claimed in claim 9, further comprising:
an input unit to be manipulated by a user to select country identification information of a target recipient from among the items of country identification information.

11. The image forming apparatus as claimed in claim 10, wherein the input unit includes a control to be manipulated by the user to select desired keyboard information from among the items of keyboard information, if the detected country identification information is not stored in the storage unit.

12. An image forming apparatus comprising:
an input unit to receive a string of characters in a predetermined format, the input unit including input controls to be configured in any of a plurality of languages;
a detection unit to determine whether the string of characters includes an identifier of a language-specific entity that is different from a language of a location that the received string of characters is from; and
a control unit to configure the input controls in one of the plurality of languages corresponding to the identifier of the language-specific entity.

13. The image forming apparatus as claimed in claim 12 further comprising:
a storage unit to store a database of input control language configurations and respective identifiers of the language-specific entity associated therewith.

14. The image forming apparatus as claimed in claim 13, wherein the control generates an error message responsive to the identifier of the language-specific entity absent the corresponding input control language configuration in the database.

15. The image forming apparatus as claimed in claim 12 further comprising:
a display unit to generate an error message responsive to the identifier of the language-specific entity being undetected by the detection unit.

16. The image forming apparatus as claimed in claim 12 further comprising:
a display unit to display a list of the plurality of languages responsive to the identifier of the language-specific entity being indeterminate by the detection unit.

17. The image forming apparatus as claimed in claim 12, wherein the predetermined format of the character string complies with Internet domain name standards.

18. The image forming apparatus as claimed in claim 17, wherein the identifier of the language-specific entity is a country code top-level domain.

19. A method of configuring an input device of an image forming apparatus in a language of a language-specific entity, the method comprising:
providing an input unit including input controls to be configured in any of a plurality of languages;
receiving a string of characters in a predetermined format;
determining whether the received string of characters includes an identifier of the language-specific entity that is different from a language of a location that the received string of characters is from; and
configuring the input controls in one of the plurality of languages corresponding to the identifier of the language-specific entity.

20. The method of configuring an input device as claimed in claim 19, wherein the determining whether the string of characters includes the identifier further comprises:
determining whether a predetermined segment of the character string is compliant with a predetermined format of the identifier.

21. The method of configuring an input device as claimed in claim 20, further comprising:
comparing the predetermined segment with stored identifiers of the language-specific entity responsive to the predetermined segment being compliant with the predetermined format; and
generating an error message responsive to the predetermined segment being non-compliant with the predetermined format.

22. The method of configuring an input device as claimed in claim 21, wherein the predetermined format of the character string complies with Internet domain name standards.

23. The method of configuring an input device as claimed in claim 22, wherein the predetermined segment of the character string is a top level segment of the Internet domain name and the predetermined format of the identifier is a format of a country code top-level domain.

24. The method of configuring an input device as claimed in 19, further comprising:
generating a list of the plurality of languages responsive to the identifier being indeterminate; and
selecting the one of the plurality of languages from the generated list.

25. A method of displaying a multilingual keyboard using an image forming apparatus, the method comprising:
receiving an e-mail address of a target recipient that is different from a location of the target recipient;
detecting country identification information in the received input e-mail address;
displaying a keyboard in a language corresponding to the detected country identification information.

26. An image forming apparatus comprising:
a storage unit to store plurality of items of keyboard information corresponding to country identification information;
a detection unit to detect the country identification information in a received an e-mail address of a target recipient that is different from a location of the target recipient;
a control unit to search whether the detected country identification information is stored in the storage unit, and if the detected country identification information is stored in the storage unit, the control unit retrieves the keyboard information corresponding to the country identification information from the storage unit to be displayed; and
a display unit to display a keyboard with the retrieved keyboard information corresponding to the country identification information.

* * * * *